United States Patent
Gu et al.

(10) Patent No.: US 11,654,576 B2
(45) Date of Patent: May 23, 2023

(54) ROBOT SYSTEM INCLUDING ROBOT HAVING HANDLE AND METHOD OF CONTROLLING ROBOT

(71) Applicant: FANUC CORPORATION, Yamanashi (JP)

(72) Inventors: Yihua Gu, Yamanashi (JP); Takashi Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 237 days.

(21) Appl. No.: 17/031,899

(22) Filed: Sep. 25, 2020

(65) Prior Publication Data

US 2021/0101291 A1 Apr. 8, 2021

(30) Foreign Application Priority Data

Oct. 8, 2019 (JP) .............................. JP2019-185439

(51) Int. Cl.
*B25J 13/02* (2006.01)
*B25J 9/00* (2006.01)
*B25J 13/08* (2006.01)

(52) U.S. Cl.
CPC ............. *B25J 13/02* (2013.01); *B25J 9/0081* (2013.01); *B25J 13/085* (2013.01)

(58) Field of Classification Search
CPC ............................... B25J 13/02; B25J 13/085
See application file for complete search history.

(56) References Cited

U.S. PATENT DOCUMENTS

| 2010/0152896 | A1* | 6/2010 | Komatsu | B25J 9/0003 |
| | | | | 700/258 |
| 2013/0110290 | A1* | 5/2013 | Geffard | B25J 9/1633 |
| | | | | 901/46 |
| 2015/0290809 | A1* | 10/2015 | Nakagawa | B25J 13/085 |
| | | | | 700/258 |
| 2017/0028565 | A1* | 2/2017 | Matsudaira | B25J 9/1674 |
| 2017/0285625 | A1* | 10/2017 | Sato | B25J 9/1633 |
| 2018/0210434 | A1* | 7/2018 | Iwatake | B25J 9/0081 |

FOREIGN PATENT DOCUMENTS

JP 2015199174 A 11/2015

* cited by examiner

*Primary Examiner* — Kira Nguyen
(74) *Attorney, Agent, or Firm* — Hauptman Ham, LLP

(57) ABSTRACT

A robot system causing a robot to operate in response to a handling force, wherein a position of the robot can be adjusted with higher accuracy. In one aspect of the present disclosure, a robot system includes a robot having a handle, a force sensor configured to detect a handling force applied to the handle, and an inching motion execution section configured to execute an inching motion of causing the robot to move by a movement amount determined in response to the handling force detected by the force sensor.

10 Claims, 11 Drawing Sheets

ROBOT SYSTEM INCLUDING ROBOT HAVING HANDLE AND METHOD OF CONTROLLING ROBOT

RELATED APPLICATIONS

The present application claims priority to Japanese Application Number 2019-185439, filed Oct. 8, 2019, the disclosure of which is hereby incorporated by reference herein in its entirety.

BACKGROUND OF THE INVENTION

1. Field of the Invention

The present invention relates to a robot system including a robot having a handle and a method of controlling a robot.

2. Description of the Related Art

A robot system has been known in which a so-called lead-through function that causes a robot to operate in response to a handling force applied to a handle provided on the robot is implemented (e.g., JP 2015-199174 A).

In the robot system that causes the robot to operate in response to the handling force, it is required to adjust a position of the robot with higher accuracy.

SUMMARY OF THE INVENTION

In an aspect of the present disclosure, a robot system includes a robot having a handle; a force sensor configured to detect a handling force applied to the handle; and an inching motion execution section configured to execute an inching motion to move the robot by a movement amount determined, in response to the handling force detected by the force sensor.

In another aspect of the present disclosure, a method of controlling a robot having a handle includes detecting, by a force sensor, a handling force applied to n the handle; and executing an inching motion to move the robot by a movement amount determined, in response to the handling force detected by the force sensor.

According to the present disclosure, a position of the robot can be adjusted with high accuracy in response to a handling force by an operator, e.g. in teaching of the robot.

DETAILED DESCRIPTION

Figure 1:
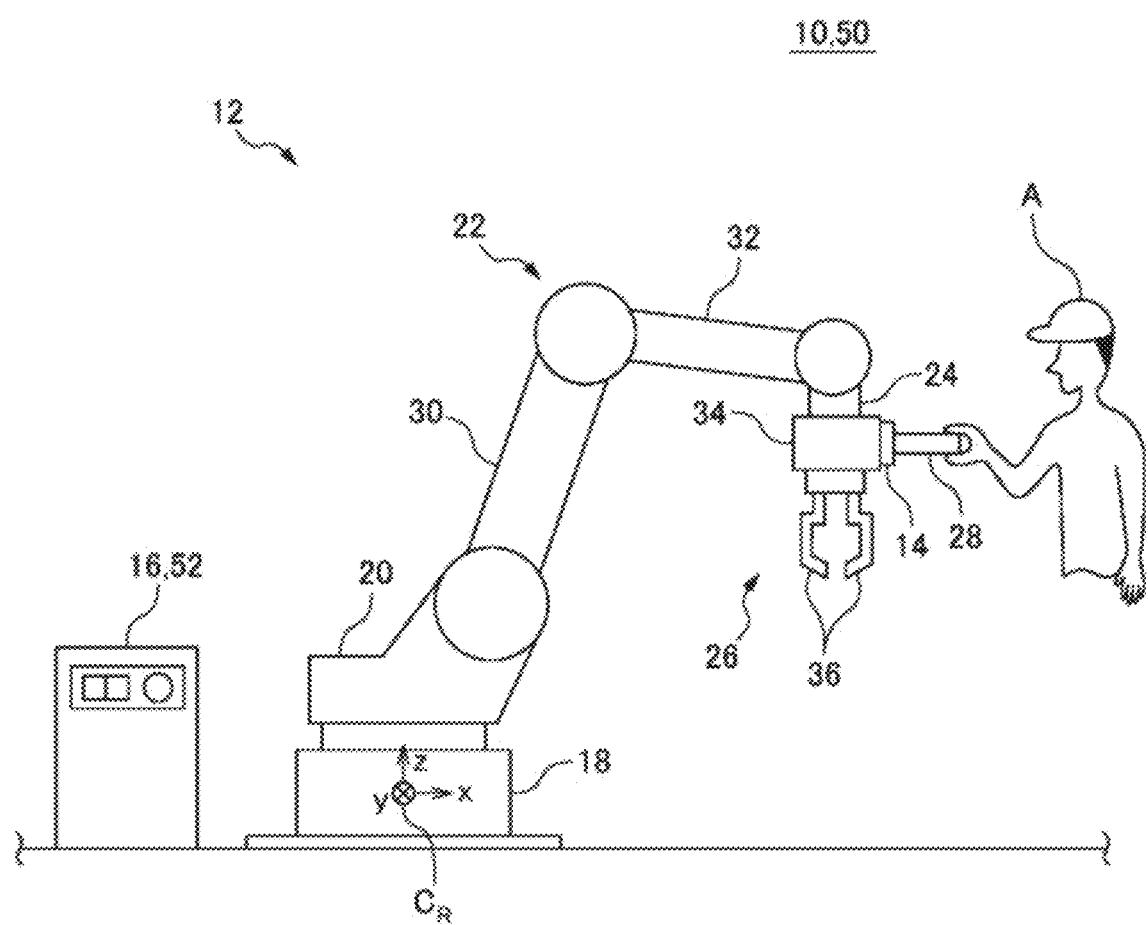
FIG. 1 is a diagram of a robot system according to an embodiment.

Hereinater, embodiments of the present disclosure will be described in detail with reference to the drawings. It should be noted that, in the various embodiments described below, similar elements are denoted by the same reference numeral, and redundant description thereof will be omitted. First, a robot system 10 according to an embodiment will be described with reference to FIG. 1 and FIG. 2. The robot system 10 includes a robot 12, a force sensor 14, a control device 16, and an input device 17 (FIG. 2).

In the present embodiment, the robot 12 is a vertical articulated robot, and includes a robot base 18, a turning body 20, a robot arm 22, a wrist 24, an end effector 26, and a handle 28. The robot base 18 is fixed on a floor of a work cell. The turning body 20 is provided at the robot base 18 so as to be pivotable about a vertical axis. The robot arm 22 includes a lower arm 30 rotatably attached. to the turning body 20, and an upper arm 32 rotatably attached to a distal end of the lower arm 30. The wrist 24 is connected to a distal end of the upper arm 32, and rotatably supports the end effector 26.

In the present embodiment, the end effector 26 is a robot hand, and includes a base 34 and a plurality of fingers 36 attached to the base 34 so as to be operable and closable. The end effector 26 can grip or release an article by opening and closing the fingers 36. Note that the end effector 26 is not limited to a robot hand, and may be a device for any work, such as a cutting tool, a laser machining head, a welding torch, a coating material applicator, etc. The handle 28 has a shape to be easily grasped. by an operator A (e.g., a recess that receives the fingers of an operator A), and is fixed to the base 34.

Servo motors (not illustrated) are provided in the respective components of the robot 12 (the robot base 18, the turning body 20, the robot arm 22, and the wrist 24). These servo motors rotate the respective movable components (the turning body 20, robot arm 22, and wrist 24) of the robot 12 about a drive shaft, in response to a command from the control device 16.

A robot coordinate system $C_R$ is set for the robot 12. The robot coordinate system $C_R$ is a coordinate system that serves as a reference for automatic control of the robot 12. In the present embodiment, the robot coordinate system $C_R$ is set such that its origin is positioned at a center of the robot base 18, and its s-axis coincides with a turning axis of the turning body 20.

The force sensor 14 detects a handling force HF applied. to the handle 28. Specifically, the force sensor 14 is a six-axis force sensor having a plurality of strain gauges, for example, and is interposed between the base 34 and the handle 28. The force sensor 14 detects the handling force HF applied to the handle 28 by the operator A, and transmits an output signal of the handling force HF to the control device

16. The control device 16 acquires a detected value $HF_V$ indicating a magnitude of the handling force HF, and a direction $HF_D$ of the handling force HF, from the output signal from the force sensor 14.

The control device 16 controls operations of the robot 12 and the force sensor 14. Specifically, the control device 16 is a computer including e.g. a processor 38 (CPU, CPU, etc.) and a memory 40 (ROM, RAM, etc.). The processor 38 is communicably connected to the memory 40 via a bus 42, and performs a calculation for carrying out various functions to be described below while communicating with the memory 40.

The processor 38 generates commands to the respective servo motors of the robot 12, in response to which the servo motors rotate the respective movable components of the robot 12. Thus, the processor 38 operates the robot 12 so as to position the end effector 26 of the robot 12 at any position and orientation in a three-dimensional space. The memory 40 temporarily or permanently stores various data.

The input device 17 is communicably connected to the control device 16 and configured to receive input of information. The input device 17 includes e.g. a push button, a switch, a keyboard, a mouse, or a touch sensor, and transmits the information input by the operator to the control device 16. Note that the input device 17 may be provided integrally with the control device 16, or may be provided at a desktop or tablet PC, a portable robot teach device (so-called teach pendent), or the handle 28 of the robot 12, separately from the control device 16. The input device 17 communicates with the control device 16 in a wired or wireless manner.

Figure 3:
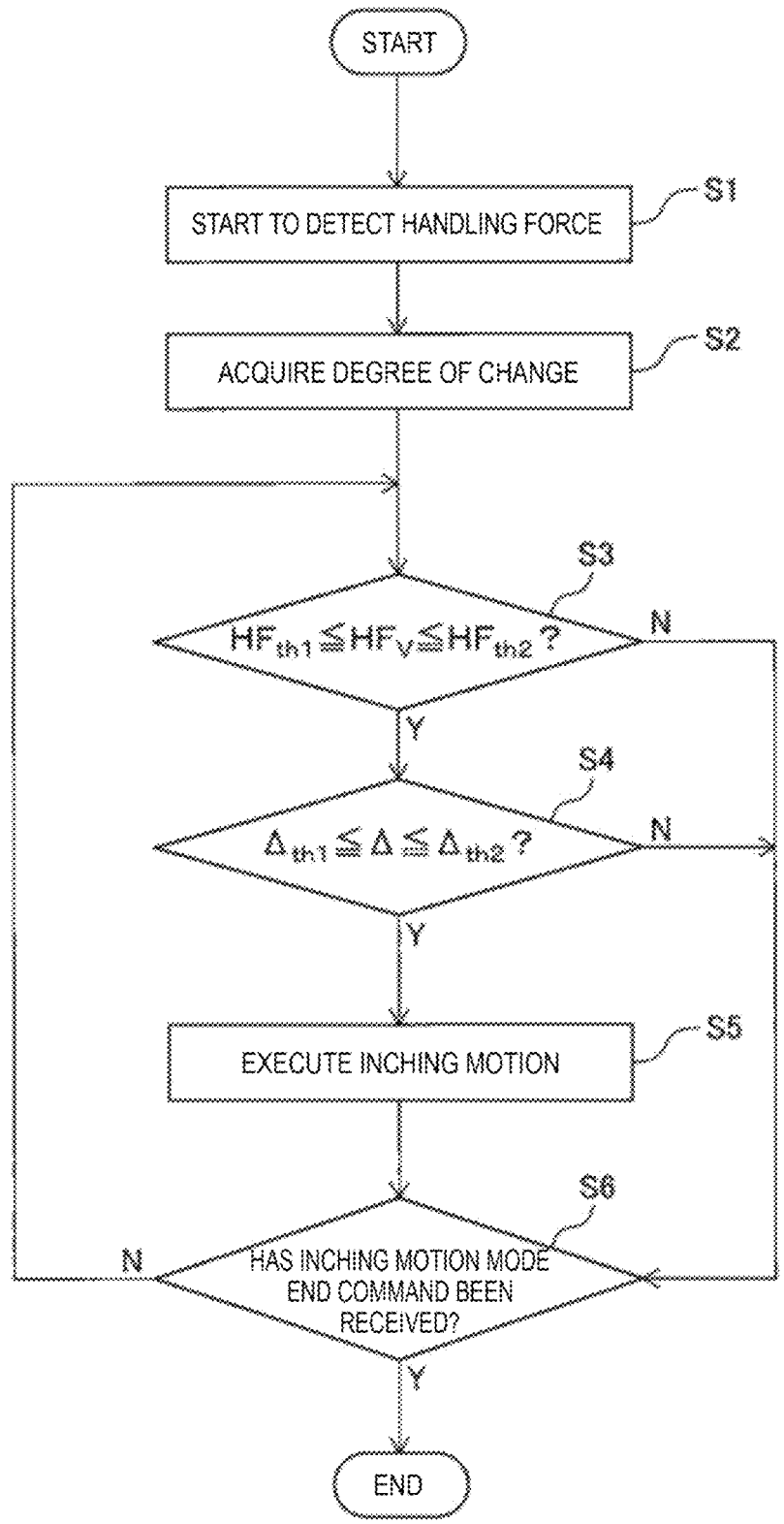
FIG. 3 is a flowchart illustrating an example of an operation process in an inching-motion mode of the robot system illustrated in FIG. 1.

In the present embodiment, the control device 16 causes the robot 12 to perform an inching motion in response to the handling force HF applied to the handle 28 by the operator A. Next, an operation of the robot system 10 in an inching-motion mode will be described with reference to FIG. 3. The flow illustrated in FIG. 3 is started when an inching-motion mode start command for transferring an operation mode of the robot 12 to the inching-motion mode is received.

In step S1, the processor 38 starts to detect the handling force HF. Specifically, the processor 38 consecutively (e.g., periodically) receives from the force sensor 14 the output signal of the handling force HF detected by the force sensor 14, and sequentially acquires the detected value $HF_V$ and the direction $HF_D$ of the handling force HF from the output signal. The processor 38 sequentially stores the information of the acquired detected value $HF_V$ and the direction $HF_D$ in the memory 40.

In step S2, the processor 38 starts to acquire a degree of change $\Delta$ in the detected value $HF_V$. As an example, the processor 38 acquires a time differential value $\delta HF^V/\delta t$ of the detected value $HF_V$ as the degree of change $\Delta$. Specifically, every time the detected value $HF_V$ is acquired, the processor 38 calculates a difference $\delta HF$ ($=HF_{V\_n}-HF_{V\_n-1}$) between the most-recently acquired detected value $HF_{V\_n}$ and the detected value $HF_{V\_n-1}$ acquired immediately before the detected value $HF_{V\_n}$.

Then, by dividing the calculated difference $\delta HF$ by a period of time $t^D$ from a time point when the force sensor 14 detects the handling force $HF_n$ corresponding to the detected value $HF_{V\_n}$ to a time point when the force sensor 14 detects the handling force $HE_{n-1}$ corresponding to the detected value $HF_{V\_n-1}$, the processor 38 calculates the degree of change $\Delta=\delta HF_V/\delta t=(HF_{V\_n}-HF_{V\_n-1})/t_D$. For example, if the force sensor 14 periodically detects the handling force HF with a period $\tau_1$, the period of time $t_D=\tau_1$ is satisfied. The processor 38 sequentially stores the calculated degree of change $\Delta$ in the memory 40. Thus, in the present embodiment, the processor 38 functions as a change acquisition section 44 (FIG. 2) configured to acquire the degree of change $\Delta$.

In step S3, the processor 38 determines whether or not the most-recently acquired detected value $HF_V$ is within a range $[HF_{th1}, HF_{th2}]$, that is equal to or higher than a lower limit, value $HF_{th1}$ and equal to or lower than an upper limit value $HF_{th2}$. The lower limit value $HF_{th1}$ and the upper limit value $HF_{th2}$ are predetermined by the operator as values indicating that the handling force HF detected by the force sensor 14 is intentionally applied to the handle 28 by the operator A, and stored in the memory 40.

When the most-recently acquired detected value $HF_V$ is within the range $[HF_{th1}, HF_{th2}]$, i.e., $HF_{th1} \leq HF_V \leq HF_{th2}$ is satisfied, the processor 38 determines YES and proceeds to step S4. On the other hand, when the most-recently acquired detected value $HF_V$ is smaller than the lower limit value $HF_{th1}$ (($HF_V<HF_{th1}$) or is larger than. the upper limit value $HF_{th2}$ ($HF_V>HF_{th2}$), the processor 38 determines NO and proceeds to step S6.

In step S4, the processor 38 determines whether or not the most-recently acquired degree of change $\Delta$ is within a range $[\Delta_{th1}, \Delta_{th2}]$ that is equal to or higher than the lower limit value $\Delta_{th1}$ and equal to or lower than the upper limit value $\Delta_{th2}$, The lower limit value $\Delta F_{th1}$ and the upper limit value $\Delta F_{th2}$ are predetermined by the operator as values indicating that the handling force HF detected by the force sensor 14 is intentionally applied to the handle 28 by the operator A, and pre-stored in the memory 40.

When the most-recently acquired degree of change $\Delta$ is within the range $[\Delta_{th1}, \Delta_{th2}]$, i.e., $\Delta_{th1} \leq \Delta \leq \Delta_{th2}$ is satisfied, the processor 38 determines YES and proceeds to step S5. On the other hand, when the most-recently acquired degree of change $\Delta$ is smaller than the lower limit value $\Delta_{th1}$ ($\Delta<\Delta_{th1}$), or is larger than the upper limit value $\Delta_{th2}$ ($\Delta>\Delta_{th2}$), the processor 38 determines NO and proceeds to step S6.

In step S5, the processor 38 executes an inching motion. Specifically, the processor 38 executes the inching motion to operate the robot 12 so as to move the end effector 26 in the direction $HF_D$ of the handling force HF detected by the force sensor 14 by a determined movement amount M. More particularly, the processor 38 defines, moves the end effector 26 from a start. point $P_S$, which a position of the end effector 26 at the start of step S5, in the direction HFD, and stops the end effector 26 when the end effector 26 reaches an end point $P_E$ which is separated from the start point $P_S$ by the movement amount M in the direction $HF_D$.

In the present embodiment, the movement amount M of the inching motion is predetermined by the operator A (e.g., M=1 [mm]) and is pre-stored in the memory 40. For example, the operator A may operate the input device 17 to set the movement amount M before executing the process of the inching-motion mode illustrated in FIG. 3.

For example, the movement amount M is determined as a value that is significantly smaller than a movement-path length $L_{TP}$ ($M<<L_{TP}$) from a first teaching T point TP1 of the end effector 26 (or a tool center point: TCP) to a second teaching point $TP_2$ next to the first teaching point $TP_1$. For example, the second teach TP2 is a work position at which the end effector 26 is to carry out a work on a workpiece.

In this way, the processor 38 executes the inching motion to move the robot 12 (specifically, the end effector 26) by the determined movement amount M, in response to the handling force HF detected by the force sensor 14. Therefore, in the present embodiment, the processor 38 functions as an inching motion execution section 46 (FIG. 2).

In step S6, the processor 38 determines whether or not it receives an inching-motion mode end command from the operator, a host controller, or a robot program. If the processor 38 determines that it receives the inching-motion mode end command (i.e., determines YES), the processor 38 ends the process illustrated in FIG. 3. On the other hand, if the processor 38 determines that it does not receive the inching-motion mode end command (i.e., determines NO), the processor 38 returns to step S3. Then, the processor 38 repeatedly executes a loop of steps S3 to S6 until it determines YES in step S6.

As described above, in the present embodiment, the processor 38 inches the robot 12 (specifically, the end effector 26) in response to the handling force HF applied to the handle 28 by the operator A. Due to this configuration, the operator A can finely adjust the position of the robot 12, arbitrarily, in response to the handling force HF, when the operator A teaches to the robot 12 the teaching points (e.g., the work positions) $2n$ for example. Whereby, e.g. in the teaching of the robot 12, it is possible to adjust the position. of the robot 12 with high accuracy, in response to the handling force HF by the operator A.

Further, in the present embodiment, the processor 38 does not execute step S5 when the detected value $HF_V$ is smaller than the lower limit value $HF_{th1}$ ($HF_V < HF_{th1}$) or larger than the upper limit value $HF_{th2}$ ($HF_V > HF_{th2}$).

According to this configuration, the processor 38 executes step S5 only when the operator A intentionally applies the handling force HF to the handle 28.

Assume that the operator A or a surrounding object unintentionally collides with the handle 28, for example. The detected value $HF_V$ of the handling force HF applied to the handle 28 in this case may be larger than the upper limit value $HF_{th2}$. In such a case, the processor 38 does not execute step S5. As a result, it is possible to prevent step S5 from being executed contrary to the intention of the operator A, and thus the operation safety of the robot 12 can be improved.

Further, in the present embodiment, the processor 38 does not execute step S5 when the degree of change $\Delta$ is smaller than the lower limit value $\Delta_{th1}$ ($\Delta < \Delta_{th1}$) or larger than the upper limit value $\Delta_{th2}$ ($\Delta > \Delta_{th2}$). For example, assume that the operator A or the surrounding object unintentionally collides with the handle 28.

The degree of change $\Delta$ in the detected value $HF_V$ of the handling force HF applied to the handle 28 in this case is increased (i.e., changes at a higher speed) when compared to a case where the operator A intentionally applies the handling force HF to the handle 28, and whereby, may be larger than the upper limit value $\Delta_{th2}$. In such a case, the processor 38 does not execute step S5. As a result, it is possible to prevent step S5 from being executed contrary to the intention of the operator A, and thus the operation safety of the robot 12 can be increased.

Note that, in step S5 described above, the processor 38 may move the end effector 26 in a direction $HF_D'$ shifted. from the direction $HF_D$ of the handling force HF detected by the force sensor 14 by a predetermined angle $\theta_D$. A direction $D_D$ and the angle $\theta_D$ for shifting from the direction $HF_D$ to the direction $HF_D'$ are predetermined by the operator, and stored in the memory 40. For example, the shifting direction $D_D$ may be defined as a direction parallel to a vertical direction.

Figure 2:
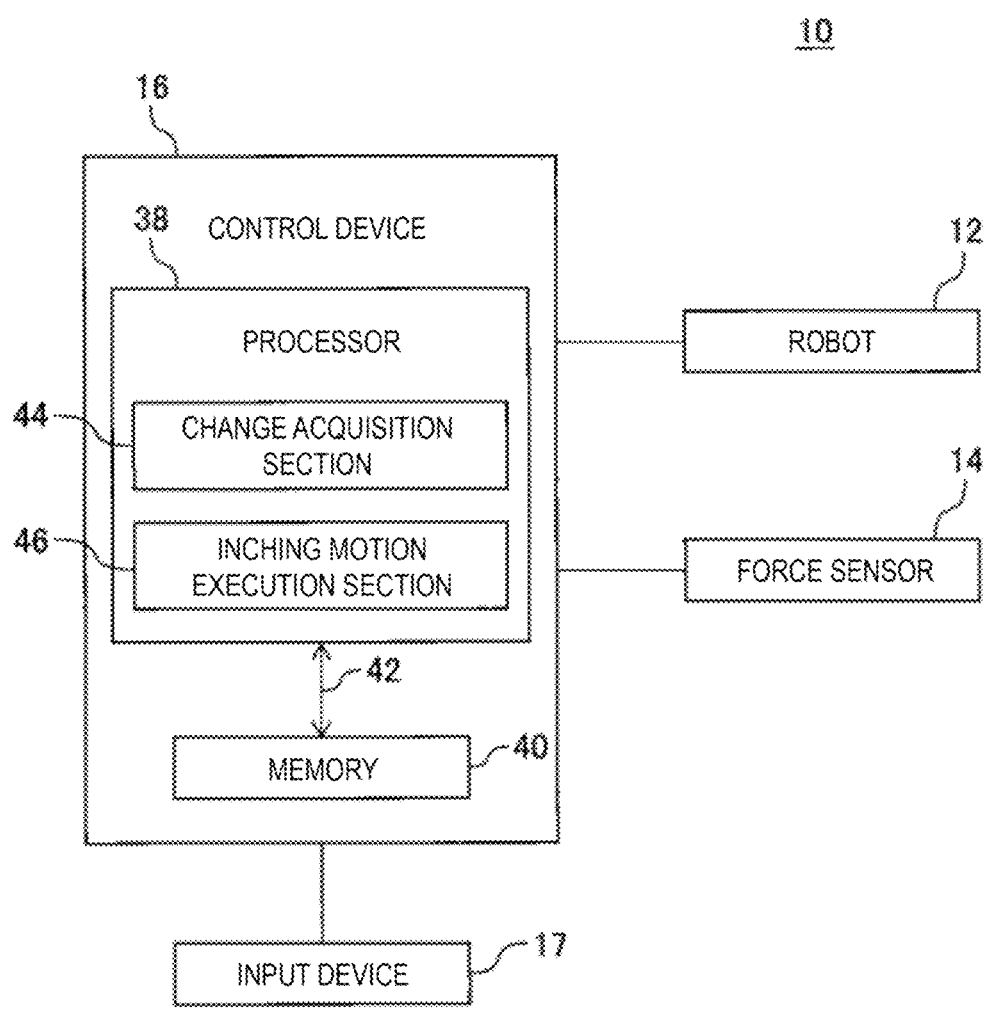
FIG. 2 is a block diagram of the robot system illustrated in FIG. 1.

For example, assume that the angle $\theta_D$ is set as $\theta_D=90°$ and the shifting direction $D_D$ is set as the direction parallel to the vertical direction, and the operator A applies the handling force HF to the handle 28 in the x-axis direction of the robot coordinate system $C_R$ in the example illustrated in FIG. 1. In this case, in step S5, the processor 38 moves the end effector 26 in the z-axis direction of the robot coordinate system $C_R$ (i.e., the vertical direction).

That is, in response to the operation by the operator A to push (or pull) the handle 28 in the horizontal direction, the end effector 26 is moved vertically downward (or vertically upward). According to this configuration, the operator A can inch the robot 12 in a larger variety of ways.

Note that the processor 38 may be configured to switch the direction in which the robot 12 is caused to inch in step S5 between the direction $HF_D$ of the handling force HF and the shifted direction $HF_D'$, in response to the input. information from the operator A. For example, the operator A operates the input device 17 so as to input inching-direction setting information for setting the inching direction of the robot 12 to either the direction $HF_D$ or the direction $HF_D'$.

In response to the inching-direction setting information input to the input device 17, the processor 38 may select. the inching direction of the robot 12 from the direction $HF_D$ and the direction $HE_D'$. In this case, the input device 17 may include the push button or the switch provided at the handle 28 and configured for selecting either the direction $HF_D$ or the direction $HF_D'$.

The processor 38 may be configured to switch the operation. mode of the robot 12 between the inching-motion mode and a lead-through-motion mode, in response to the input information from the operator A. In the lead-through-motion mode, the processor 38 continuously moves the robot 12 in the direction $HF_D$ of the handling force HF while the force sensor 14 is detecting the handling force HF (more specifically, while the detected. value $HF_V$ is continuously equal to or larger than the lower limit value $HF_{th1}$), which is so-called the lead-through function. In this lead-through-motion mode, the processor 38 may change the movement speed of the robot 12 so as to be greater in response to the detected value $HF^V$ of the handling force HF.

For example, the operator A operates the input. device 17 so as to input information for selecting either the inching-motion mode or the lead-through-motion mode. The input device 17 transmits the inching-motion mode start command or a lead-through-motion mode start command to the processor 38, in response to the input information from the operator A.

When the processor 38 receives the inching-motion mode start command from the input device 17, the processor 38 switches the operation mode of the robot 12 to the inching-motion mode and starts the flow illustrated in FIG. 3. On the other hand, when the processor 38 receives the lead-through-motion mode start command from the input device 17, the processor 38 switches the operation mode of the robot 12 to the lead-through-motion mode and starts the lead-through motion flow described above. In this case, the input device 17 may include the button or the switch provided at the handle 28 and configured for selecting the inching-motion mode or the lead-through-motion mode.

According to this configuration, if the operator A desires to move the robot 12 over a long distance, the operator A sets the operation mode of the robot 12 to the lead-through-motion mode, while if the operator A desires to finely adjust the position of the robot 12, the operator A sets the operation mode of the robot 12 to the inching-motion mode. In this way, the operator A can operate the robot 12 in a larger variety of ways, depending on circumstances.

Note that, in the flow illustrated in FIG. 3, the processor 38 may repeatedly execute the loop of steps S3 to S6 with a period $\tau_2$ (e.g., 1 [sec]), while it determines NO in step S6.

In this case, if the operator A intermittently applies the handling force HF to the handle 28, the processor 38 executes step S5 with the period $\tau_2$, whereby the end effector 26 inches with the period $\tau_2$ so as to gradually advance in the direction $HF_{th1}$ of the handling force HF in a stepwise manner.

Alternatively, the processor 38 may determine whether or not the detected value $HF_V$ of the handling force HF becomes smaller than the lower limit value $HF_{th1}$ ($HF_V < HF_{th1}$) after executing step S5. Then, when the detected value $HF_V$ becomes smaller than the lower limit value $HF_{th1}$, the processor 38 proceeds to step S6. On the other hand, when the detected value $HF_V$ continues to be equal to or larger than the lower limit value $HF_{th1}$ ($HF_V > HF_{th1}$), the processor 38 may wait until $HF_V < HF_{th1}$ is satisfied.

In this case, if the operator A continuously applies the handling force HF to the handle 28, the processor 38 does not execute the inching motion of the robot 12 again unless the operator A releases (or significantly reduces) the handling force HF to be applied to the handle 28, after executing the inching motion of step S5 once. According to this configuration, the operator A can more carefully cause the robot 12 to inch.

Figure 4:
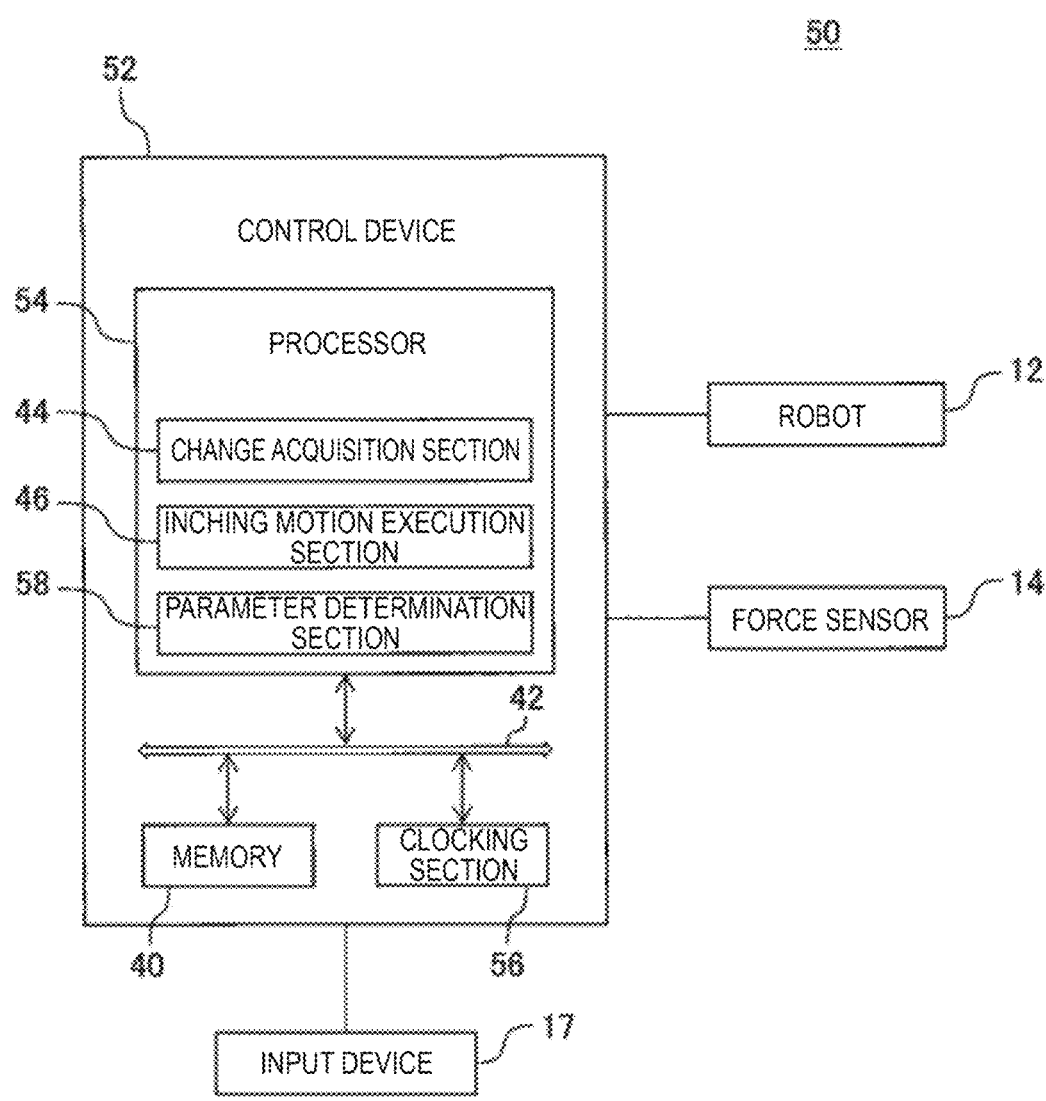
FIG. 4 is a block diagram of a robot system according to another embodiment.

Next, a robot system 50 according to another embodiment will be described with reference to FIG. 1 and FIG. 4. The robot system 50 differs from the above-described robot system 10 in a control device 52. The control device 52 includes a processor 54, the memory 40, and a clocking section 56. The processor 54 is communicably connected to the memory 40 and the clocking section 56 via the bus 42, and performs calculations for executing various functions to be described below while communicating with the memory 40 and the clocking section 56. The clocking section 56 clocks an elapsed time from a certain time point in response to a command from the processor 54.

Figure 5:
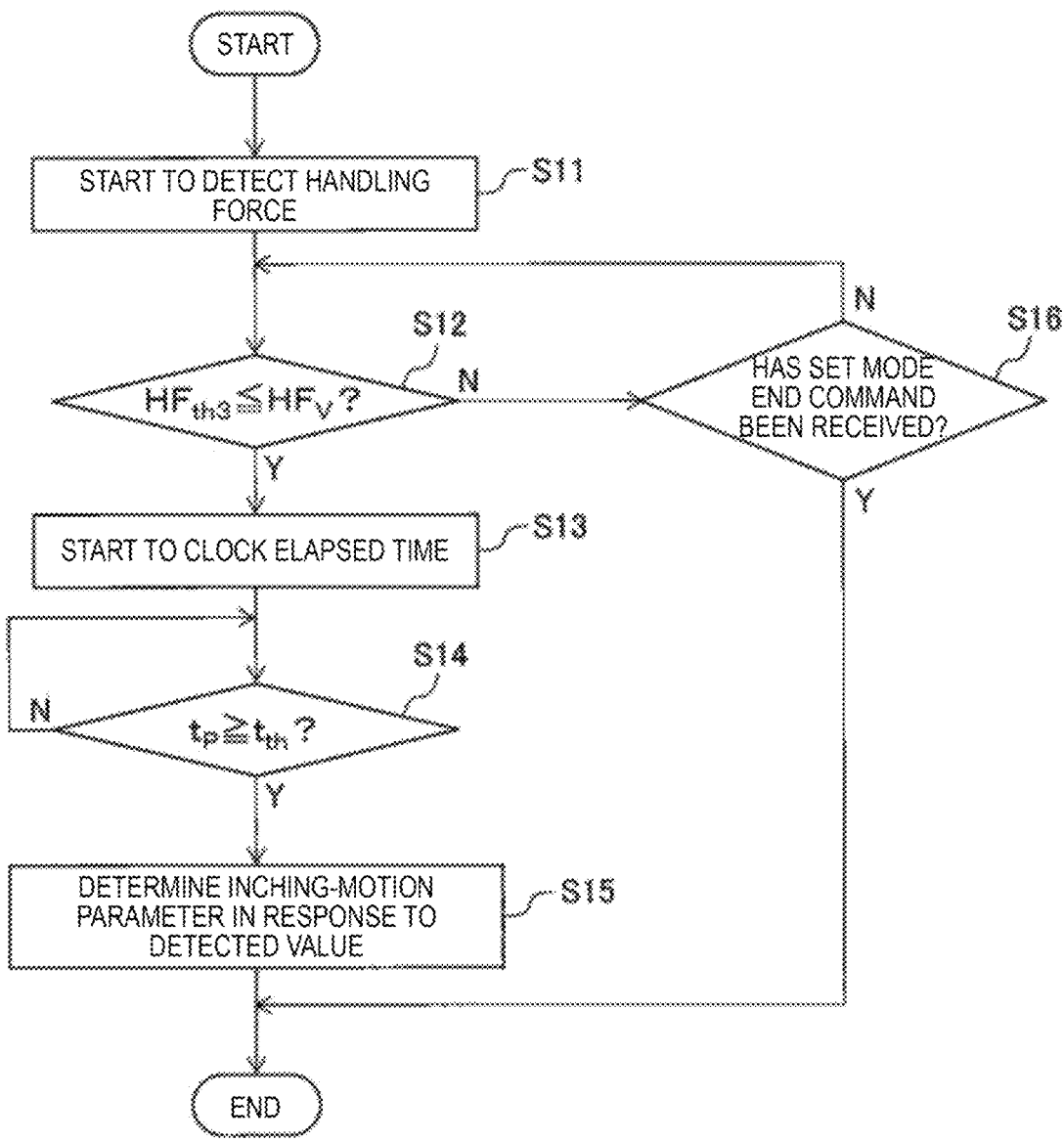
FIG. 5 is a flowchart illustrating an example of an operation process in a set operation mode of the robot system illustrated in FIG. 4.

In the present embodiment, the operator A presets an inching-motion parameter including the movement amount N of the inching motion before causing the robot 12 to perform the inching motion. Next, a method or setting the inching-motion parameter in the robot system 50 will be described with reference to FIG. 5. A flow illustrated in FIG. 5 is started when the processor 54 receives from an operator, a host controller, or a computer program a set mode start command for transferring the operation mode of the robot 12 to a set mode.

In step S1, the processor 54 starts to detect the handling force HF, similarly to step S1 described above. In step S12, the processor 54 determines whether or not the most-recently acquired detected value $HF_V$ is equal to or larger than a predetermined threshold value $HF_{th3}$. The threshold value $HF_{th3}$ is predetermined by the operator, and stored in the memory 40.

The processor 54 determines YES when the detected value $HF_V$ is equal to or larger than the threshold value $HF_{th3}$ ($HF_V \geq HF_{th3}$), and proceeds to step S13, while the processor 54 determines NO when $HF_V < HF_{th3}$ is satisfied, and proceeds to step S16. Note that the threshold value $HF_{th3}$ may be the same value as the above-described threshold value $HF_{th1}$, or may be a different value therefrom.

In step S13, the processor 54 activates the clocking section 56 to clock an elapsed time $t_P$ from a time point when it is determined YES in step S12. In step S14, the processor 54 determines whether or not the elapsed time $t_P$ clocked by the clocking section 56 reaches a predetermined time $t_{th}$. The time $t_{th}$ is predetermined by the operator (e.g., 2 [sec]), and is stored in the memory 40.

In step S15, the processor 54 determines the inching-motion parameter in response to the detected value $HF_V$ detected during the period of time $t_{th}$ from the time point when clocking of the elapsed time $t_P$ is started in step S13 until it is determined YES in step S14. As an example, the processor 54 determines the movement amount M as the inching-motion parameter in response to the maximum value $HF_{V\_MAX}$ of the detected value $HF_V$ detected within the period of time $t_{th}$.

For example, the processor 54 determines the movement amount M such that $M=M_1$ (e.g., $M_1$1 [mm]) if the maximum value $HF_{V\_MAX}$ satisfies $HF_{th3} < HF_{V\_MAX} \leq HF_{V\_MAX1}$; $M=M_2$ ($>M_1$, e.g., $M_2=2$ [mm]) if the maximum value $HF_{V\_MAX}$ satisfies $HF_{V\_MAX1} < HF_{V\_MAX} \leq HF_{V\_MAX2}$; and $M=M_3$ ($>M_2$, e.g., $M_3=3$ [mm]) if the maximum value $HF_{V\_MAX}$ satisfies $HF_{V\_MAX2} < HF_{V\_MAX} \leq HF_{V\_MAX3}$. These threshold values $HF_{V\_MAX1}$, $HF_{V\_MAX2}$, and $HF_{V\_MAX3}$ are predetermined by the operator and stored in memory 40.

In this way, the processor 54 determines the movement amount H such that the movement amount M increases in response to a magnitude of the maximum value $HF_{V\_MAX}$. Alternatively, the processor 54 may calculate an integral value $\int [HF_V] dt$ or an average value $HF_{V\_AVE}$ of the detected value $HF_V$ detected within the period of time $t_{th}$ and determine the movement amount M such that the movement amount M increases in response to a magnitude of $\int [HF_V] dt$ or the average value $HF_{V\_AVE}$.

Thus, in the present embodiment, the processor 54 determines the movement amount M as the inching-motion parameter, based on the handling force HF detected by the force sensor 14. Accordingly, the processor 54 functions as a parameter determination section 58 configured to determines the inching-motion parameter. The processor 54 stores the determined movement amount M in the memory 40.

On the other hand, when it is determined NO in step S12, in step S16, the processor 54 determines whether or not it receives a set mode end command from the operator, the host controller, or the computer program. When the processor 38 determines that it receives the set mode end command (i.e., determines YES), the processor 38 ends the process illustrated in FIG. 5. On the other hand, when the processor 38 determines that it does not receive the set mode end command (i.e., determines NO), the processor 38 returns to step S12.

As described above, in the flow of the set mode illustrated in FIG. 5, the processor 54 determines the inching-motion parameter (the movement amount M) for executing the inching motion in step S5 in FIG. 3, in response to the detected value $HF_V$. According to this configuration, the operator A can intuitively set the movement amount N to a desired value by changing the magnitude of the handling force HF applied to the handle 28.

Figure 6:
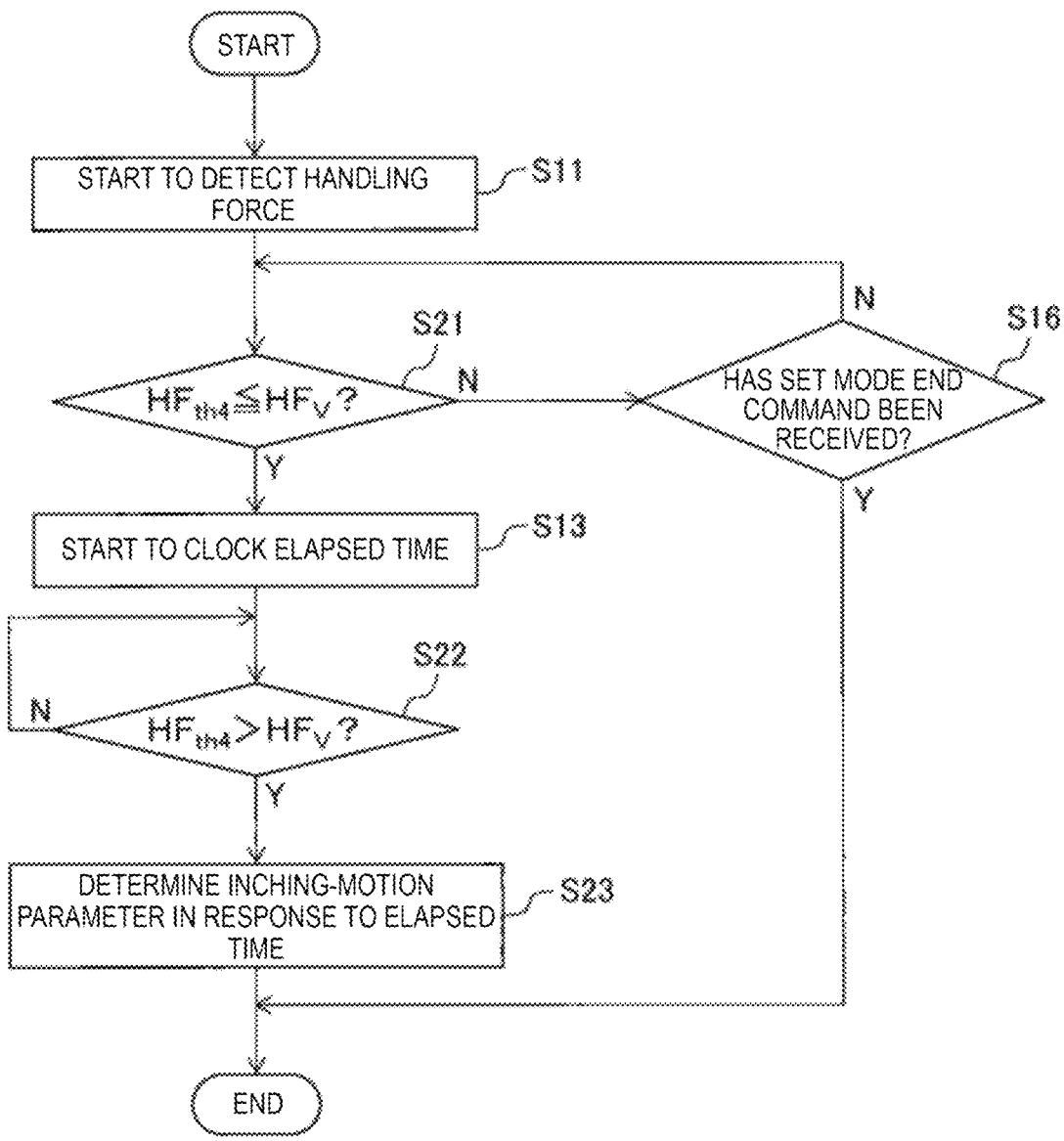
FIG. 6 is a flowchart illustrating another example of the operation process in the set operation mode of the robot system illustrated in FIG. 4.

Next, another method of setting the inching-motion parameter in the robot system 50 will be described with reference to FIG. 6. Note that, in a flow illustrated in FIG. 6, a process similar to that in the flow illustrated in FIG. 5 will be denoted by the same step number, and redundant description thereof will be omitted. The flow illustrated in FIG. 6 is started when the set mode start command is received, similarly as the flow illustrated in FIG. 5.

After step S11, in step S21, the processor 54 determines whether or not the most-recently acquired detected value $HF_V$ becomes equal to or larger than a predetermined threshold value $HF_{th4}$ ($HF_V \geq HF_{th4}$). The threshold value $HF_{th4}$ is predetermined by an operator, and stored in the memory 40. The processor 54 determines YES when is satisfied, and proceeds to step S13, while the processor 54 determines NO when $HF_V<HF_{th4}$ is satisfied, and proceeds to step S16. Note that the threshold value $HF_{th4}$ may be the same value as the above-described lower limit value $HF_{th1}$ (or the threshold value $HF_{th3}$), or may be a different. value therefrom.

After the clocking of the elapsed time $t_P$ from the time point when it is determined YES in step S21 is started. by the clocking section 56 in step S13, in step S22, the processor 54, determines whether or not the most-recently acquired detected value $HF_V$ becomes smaller than the threshold value $HF_{th4}$ ($HF_V<HF_{th4}$).

The processor 54 determines YES when $HF_V<HP_{th4}$ is satisfied and proceeds to step S23, while the processor 54 determines NO when $HF_V \geq HP_{th4}$ and loops step S22. The processor 54 acquires the elapsed time $t_P$ clocked by the clocking section 56 at a time point when it is determined YES in step S22, and stores the elapsed time tp in the memory 40. This elapsed time $t_P$ indicates a period of time when the detected value $HF_V$ continuously exceeds the threshold value $HF_{th4}$.

In step S23, the processor 54 functions as the parameter determination section 58 to determine the inching-motion parameter in response to the elapsed time $t_P$. For example, the processor 54 determines the movement amount M such that $M=M_1$ if the elapsed time $t_P$ stored in the memory 40 when it is determined YES in step 22 satisfies $t_{p1}<t_p \leq t_{p2}$; $M=M_2$ if the elapsed time $t_P$ satisfies $t_{p2}<t_p \leq t_{p3}$; and $M=M_3$ if the elapsed time $t_P$ satisfies $t_{p3}<t_p \leq t_{p4}$.

These threshold values $t_{p1}$, $t_{p2}$, $t_{p3}$, and $t_{p4}$ are predetermined by the operator (e.g., $t_{p1}=0$, $t_{p2}=1$ [sec], $t_{p3}=3$ [sec], and $t_{p4}=5$ [sec]) and pre-stored in the memory 40. In this way, the processor 54 determines the movement amount M such that the movement. amount M increases in response to the elapsed time $t_P$. The processor 54 stores the determined movement amount M in the memory 40.

As described above, in the flow of the set mode illustrated an FIG. 6, the processor 54 determines the inching-motion parameter (the movement amount M) in response to the period of time $t_P$ when the detected value $HF_V$ continuously exceeds the threshold value $HF_{th4}$. According to this configuration, the operator A can intuitively set the movement amount M to the desired value by changing the period of time when the operator A continues to apply the handling force HF to the handle 28.

Figure 7:
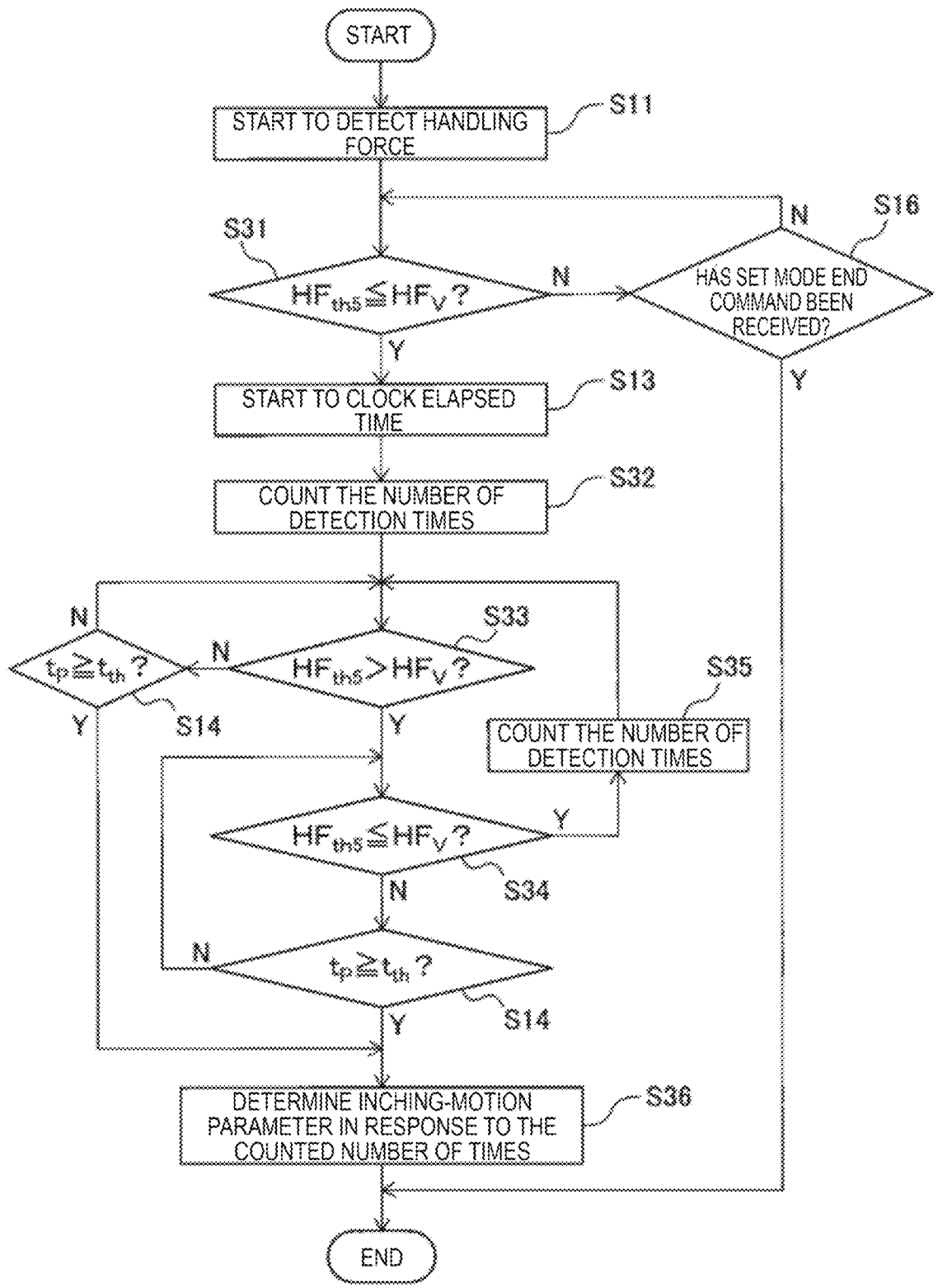
FIG. 7 is a flowchart illustrating yet another example of the operation process in the set operation mode of the robot system illustrated in FIG. 4.

Next, yet another method of setting the inching-motion parameter in the robot system 50 will be described with reference to FIG. 7. Note that, in the flow illustrated in FIG. 7, a process similar to that in the flow illustrated in FIG. 5 will be denoted by the same step number, and redundant description thereof will be omitted. Similarly as the flow illustrated in FIG. 5, the flow illustrated in FIG. 7 is started. when the set mode start command is received.

After step S11, in step S31, the processor 54 determines whether or not the most-recently acquired detected value $HF_V$ becomes equal to or larger than a predetermined threshold value $HF_{th5}$ ($HF_V \geq HF_{th5}$). The threshold value $HF_{th5}$ is predetermined by the operator, and stored in the memory 40. The processor 54 determines YES when $HF_V \geq HF_{th5}$ is satisfied, and proceeds to step S13, while the processor determines NO when $HF_V<HF_{th5}$ is satisfied, and proceeds to step S16. Note that the threshold value $HF_{th5}$ may be the same value as the above-described lower limit value $H_{th1}$ (or the threshold value $HF_{th3}$ or $HF_{th4}$), or may be a different value therefrom.

In step S13, after clocking of the elapsed time $t_P$ from a time point when it is determined YES in step S31 is started by the clocking section 56, in step S32, the processor 54 counts the number of times "n" for which the handling force HF is detected. In this step S32, the processor 54 sets the number of times "n" to "1".

In step S33, the processor 54 determines whether or not the most-recently acquired detected value $HF_V$ becomes smaller than the threshold $HF_{th5}$ ($HF_V<HF_{th5}$). The processor 54 determines YES when $HF_V<HF_{td5}$ is satisfied, and proceeds to step S34, while the processor 54 determines NO when $HF_V \geq HF_{th5}$ is still satisfied, and proceeds to step S14.

In step S34, similarly as in above step S31, the processor 54 determines whether or not the most-recently acquired detected value $HF^V$ becomes equal to or larger than the threshold value $HF_{th5}$ ($HF_V \geq HF_{th5}$). The processor 54 determines YES when $HF_V \geq HF_{th5}$ is satisfied, and proceeds to step S35, while the processor 54 determines NO when $HF_V<HF_{th5}$ is satisfied, and proceeds to step S14. In step S35, the processor 54 counts the number of times "n" for which the handling force HF is detected. Specifically, the processor 54 increments the number of times "n" by "1" (n=n+1).

On the other hand, when it is determined NO in step S33, the processor 54 executes step S14 described above, and the processor 54 proceeds to step S36 when is determines YES, while the processor 54 returns to step S33 when is determines NO. Further, when it is determined NO in step S34, the processor 54 executes step S14, and proceeds to step S36 when it determines YES, while the processor 54 returns to step S34 when it determines NO.

In step S36, the processor 54 functions as the parameter determination section 58 to determine the inching-motion parameter in response to the counted number of times "n". Here, the number of times "n" counted at the start of this step S36 indicates the number of times for which the detected value $HF_V$ of the handling force HF detected by the force sensor 14 exceeds the threshold value $HF_{th5}$ and subsequently becomes lower than the threshold value $HF_{th5}$ during the period of time $t_{th}$ from the time point when the clocking of the elapsed time $t_P$ is started in step S13 until it is determined YES in step S14. That is, the number of times "n" indicates the number of times for which the force sensor 14 detects the handling force HF within the predetermined period of time $t_{th}$.

For example, if the number of times "n" is $n_1$ (e.g., n=$n_1$=1), the processor 54 determines the movement amount M as $M=M_1$, if the number of times "n" is $n_2$ (e.g., n=$n_2$=2), the processor 54 determines the movement amount M as $M=M_2$, and if the number of times "n" is $n_3$ (e.g., n=$n_3$=3), the processor 54 determines the movement amount M as $M=M_3$. These reference numbers of times "$n_1$", "$n_2$", and "$n_3$" are predetermined by the operator, and stored in the memory 40. In this way, the processor 54 determines the movement amount M as the inching-motion. parameter, in response to the number of times "n" for which the force sensor 14 detects the handling force HF within the predetermined. period of time $t_{th}$. The processor 54 stores the determined movement amount M in the memory 40.

As state above, in the flow of the set mode illustrated in FIG. 7, the processor 54 determines the inching-motion parameter (movement amount M) in response to the number of times "n" for which the handling force HF is detected. According to this configuration, the operator A can intuitively set the movement amount M to the desired value by changing the number of times for which the operator A taps the handle 28.

When receiving the set mode start command, the processor 54 transfers the operation mode of the robot 12 to the set mode, and starts the process illustrated in FIG. 5, FIG. 6, or FIG. 7. Then, the processor 54 determines the movement amount M and stores it in the memory 40. Thereafter, when receiving the inching-motion mode start command, the processor 54 functions as the change acquisition section 44 and the inching motion execution section 46 and executes the flow illustrated in FIG. 3, similarly to the above-described robot system 10.

Note that the processor 54 may be configured to switch the operation mode of the robot 12 between the set mode and the inching-motion mode, in response to the input information from the operator A. For example, the operator A operates the input device 17 to input the information for selecting either the set mode or the inching-motion mode. The input device 17 transmits the set mode start command or the inching-motion mode start command to the processor 38 in response to the input information from the operator A.

If the processor 38 receives the set mode start command from the input device 17, the processor 38 switches the operation mode of the robot 12 to the set mode, and starts the flow illustrated in FIG. 5, FIG. 6, or FIG. 7, On the other hand, if the processor 38 receives the inching-motion mode start command from the input device 17, the processor 38 switches the operation mode of the robot 12 to the inching-motion mode, and starts the flow illustrated in FIG. 3. In this case, the input device 17 may include the button or switch provided at the handle 28 for selecting either the set mode or the inching-motion mode.

Figure 8:
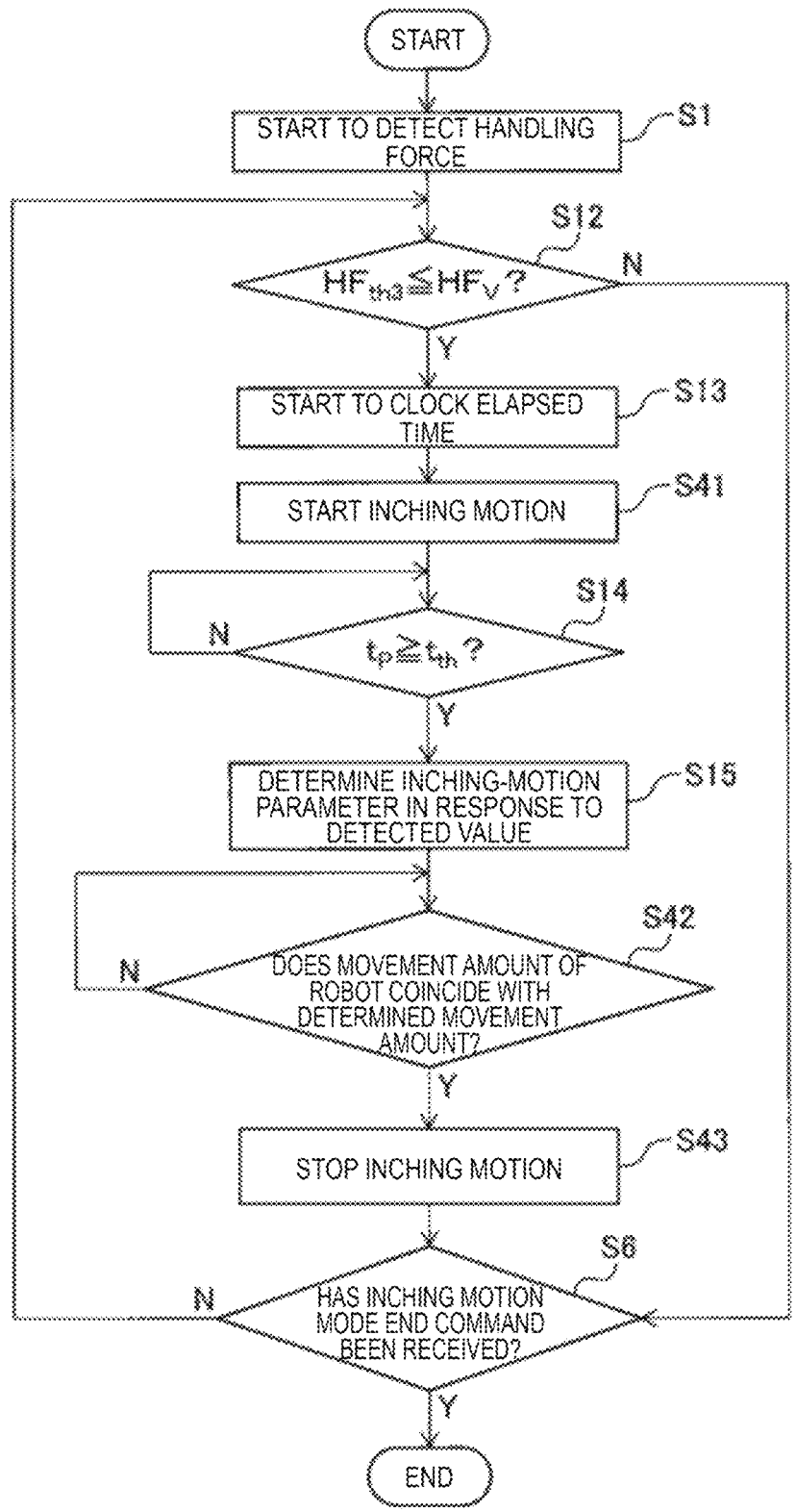
FIG. 8 is a flowchart illustrating an example of an operation process in an inching-motion mode of the robot system illustrated in FIG. 4.

Next, another example of the inching motion flow to be executed by the processor 54 in the robot system 50 will be described with reference to FIG. 8. Note that, in the flow illustrated in FIG. 8, a process similar to that in the flow illustrated in FIG. 3 and FIG. 5 will be denoted by the same step number, and redundant description. thereof will be omitted. The flow illustrated in FIG. 8 is started. when the inching-motion mode start command is received, similarly to the flow in FIG. 3 described above.

The processor 54 starts to detect the handling force HF in step S1, and determines whether or not the most-recently acquired detected value $HF_V$ of the handling force HF becomes equal to or larger than the threshold value $HF_{th3}$ in step S12. Then, in step S13, the clocking section 56 is activated to clock the elapsed time $t_P$ from the time point when it is determined YES in step S12.

In step S41, the processor 54 functions as the inching motion execution section 46 to start the inching motion of the robot 12. Specifically, the processor 54 operates the robot 12 so as to start the inching motion to move the end effector 26 in the direction $HF_D$ of the handling force HF. In step S14, the processor 54 determines whether or not the elapsed time $t_P$ clocked by the clocking section 56 reaches the predetermined time $t_{th}$.

In step S15, the processor 54 functions as the parameter determination section 58 to determine the movement amount M as the inching-motion parameter in response to the detected value $HF_V$ (the maximum value $H_{V\_MAX}$ or the average value $HE_{V\_AVE}$) detected during the period of time $t_{th}$ from the time point when the clocking of the elapsed time $t_P$ is started in step S13 until it is determined YES in step 14.

In step S42, the processor 54 determines whether or not a movement amount L of the robot 12 (in particular, the end effector 26) in the inching motion started in step S41 coincides with the determined movement amount M. The movement amount L by which the robot 12 moves the end effector 26 from the start of step S41 can be obtained from the rotation number of each servo motor incorporated in the robot 12, for example. In this case, a rotation detector (encoder, Hall element, or the like) for detecting the rotation number of the servo motor may be provided in the robot 12.

In step S42, the processor 54 determines YES when the acquired movement amount L coincides with the movement amount M determined in step S15, and proceeds to step S43, while the processor 54 determines NO when the movement amount L does not coincide with the movement amount M, and loops step S42. In step S43, the processor 54 stops the end effector 26 of the robot 12, thereby stopping the inching motion.

As described above, in the present embodiment, the processor 54 determines the movement amount M as the inching-motion parameter in response to the detected value $HF_V$, while eecutinq the inching motion of the robot 12. According to this configuration, the operator A can intuitively set the movement amount M to the desired value in response to the magnitude of the handling force HF applied to the handle 28, each time the inching motion is performed.

Note that, in the flow illustrated in FIG. 8, the processor 54 may execute steps S14 and S15 next to step S13 to determine the movement amount M, and subsequently execute step S41. In this case, the processor 54 starts the inching motion in step S41 after determining the movement amount M.

Also, a movement speed $V_I$ of the robot 12 (end effector 26) in the inching motion to be started in step S41 may be set such that a period of time, which is necessary for the robot 12 to inch by a minimum movement amount $M_1$ to be determined by the processor 54 in step S15, is equal to or larger than the predetermined period of time $t_{th}$. Due to this, the robot 12 can be prevented. from inching by the movement amount $M_1$ after the start of step S41 before the inching-motion parameter is determined in step S15. The operator A may operate the input device 17 to preset the movement speed $V_I$.

Figure 9:
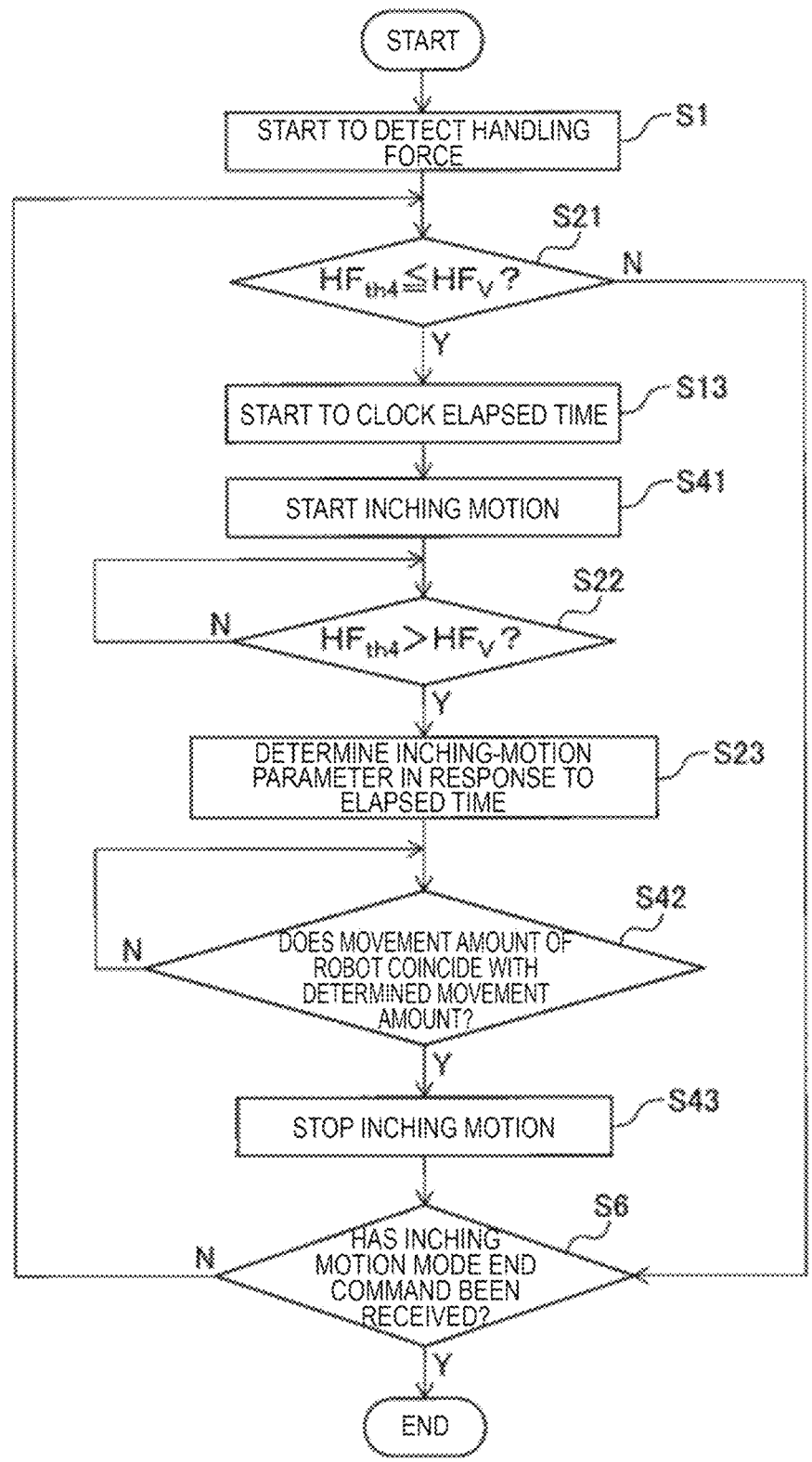
FIG. 9 is a flowchart illustrating another example of the operation process in the inching-motion mode of the robot system illustrated in FIG. 4.

Next, yet another example of the inching motion flow executed by the processor 54 of the robot system 50 will be described with reference to FIG. 9. Note that, in the flow illustrated in FIG. 9, a process similar to that in the flow illustrated in FIG. 3, FIG. 6, and FIG. 8 will be denoted by the same step number, and redundant description thereof will be omitted. The flow illustrated in FIG. 9 is started when the inching-motion mode start command is received, similarly to the above-described flow in FIG. 3.

The processor 54 starts to detect the handling force HF in step S1, and determines whether or not the most-recently acquired detected value $HF_V$ becomes equal to or larger than. the predetermined threshold. $HF_{th4}$ ($HF_V \geq HF_{th4}$) in step S21. Then, in step S13, the clocking section 56 is activated to clock the elapsed time $t_P$ from the time point when it is determined YES in step S21.

In step S41, the processor 54 starts the inching motion of the robot 12, and in step S22, the processor determines whether or not the most-recently acquired detected value $HF_V$ becomes smaller than the threshold $HF_{th4}$ ($HF_V < HF_{th4}$). In step S23, the processor 54 functions as the parameter determination section 58 to determine the inching-motion parameter in response to the elapsed time $t_P$.

In step S42, the processor 54 determines whether or not the movement amount L of the robot 12 (in particular, the end effector 26) in the inching motion started in step S41 coincides with the movement amount M determined in step S23. If it is determined YES in step S42, in step S43, the processor 54 stops the inching motion of the robot 12.

As described above, in the present embodiment, the processor 54 determines the movement amount M as the inching-motion parameter, in. response to the period of time $t_P$ (i.e., the elapsed time $t_P$) when the detected value $HF_V$ continuously exceeds the threshold value $HF_{th4}$, while executing the inching motion of the robot 12. According to this configuration, the operator A can intuitively set the movement amount M to the desired. value in response to the period of time when the operator A continuously applies the handling force HF to the handle 28, each time the inching motion is performed.

Note that, in the flow illustrated in FIG. 9, the processor 54 may execute steps S22 and S23 next to S13 to determine the movement amount M, and subsequently execute step S41. In this case, the processor 54 starts the inching motion in step S41 after determining the movement amount M.

Also, the movement speed $V_I$ of the robot 12 (end effector 26) in the inching motion to be started in step S41 in FIG. 9 may be set such that the time necessary for the robot 12 to inch by the movement amount $M_1$, $M_2$, or $M_3$, which can be determined by the processor 54 in step S15, becomes equal to or larger than the threshold value $t_1$, $t_2$, or $t_3$ to be used to determine the movement amount $M_1$, $M_2$, or $M_3$ in step S23. Due to this, it is possible to prevent the robot 12 from inching by the movement amount $M_1$, $M_2$, or $M_3$ after the start of step S41, before the inching-motion parameter is determined in step S23.

Figure 10:
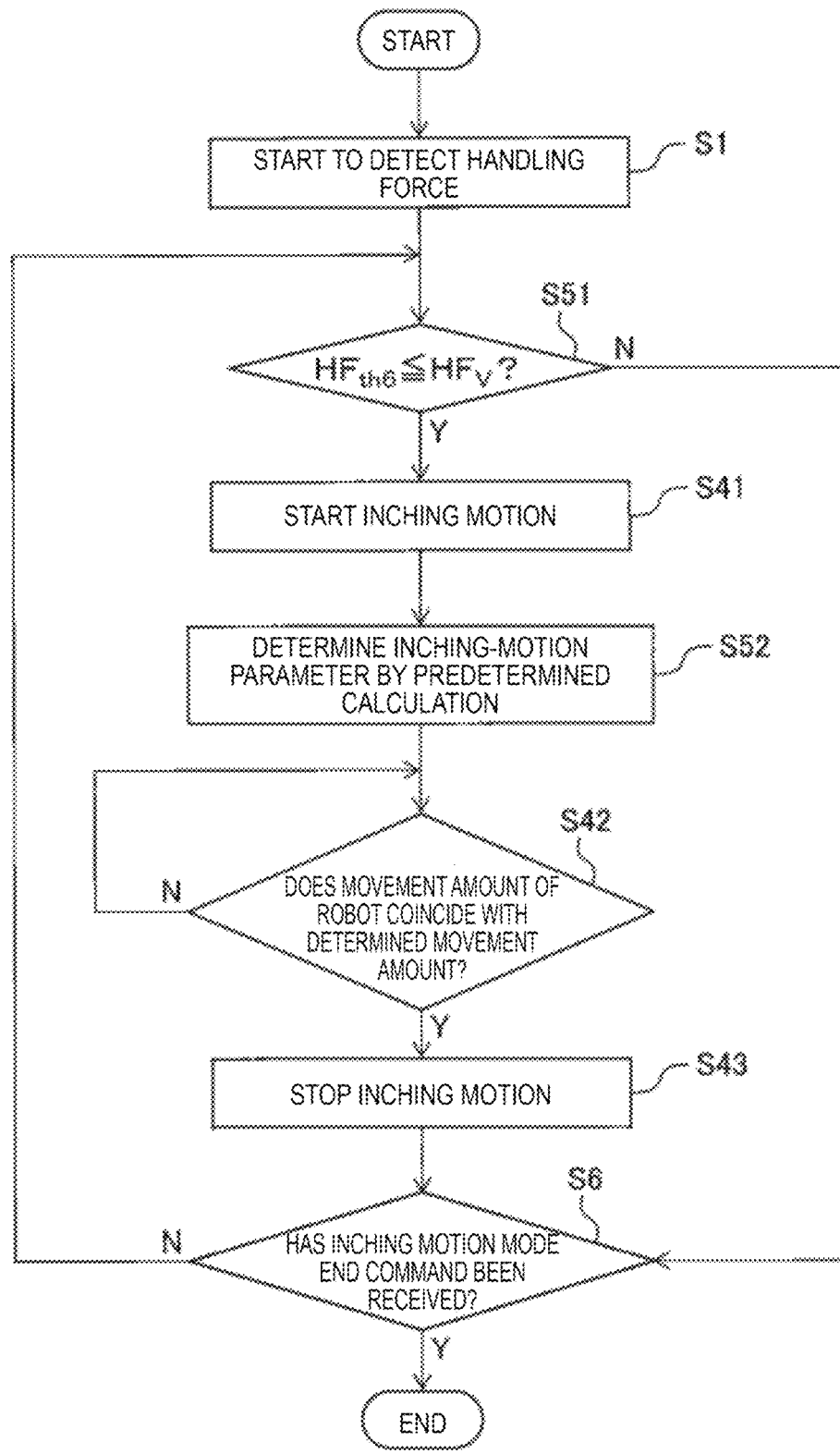
FIG. 10 is a flowchart illustrating yet another example of the operation process in the inching-motion mode of the robot system illustrated in FIG. 4.

Next, yet another example of the inching motion flow executed by the processor 54 of the robot system 50 will be described with reference to FIG. 10. Note that, in the flow illustrated in FIG. 10, a process similar to that in the flow illustrated in FIG. 8 will be denoted by the same step number, and redundant description thereof will be omitted. The flow illustrated in FIG. 10 is started when the inching-motion mode start command is received, similarly to the above-described flow in FIG. 3. The processor 54 starts to detect the handling force HF in step S1.

In step S51, the processor 54 determines whether or not the most-recently acquired detected value $HF_V$ becomes equal to or larger than a predetermined threshold value $HF_{th6}$ ($HF_V \geq HF_{th6}$). The threshold value $HF_{th6}$ is predetermined by the operator, and stored in the memory 40. This threshold value $HF_{th6}$ may be the same value as the above-described lower limit value $HF_{th1}$ (or threshold value $HF_{th3}$, $HF_{th4}$, or $HF_{th5}$), or may be a different value.

The processor 54 determines YES when $HF_V \geq HF_{th6}$ is satisfied, and proceeds to step S41, while the processor 54 determines NO when $HF_V < HF_{th6}$ is satisfied, and proceeds to step S6. In step S41, the processor 54 starts the inching motion to move the end effector 26 of the robot 12 in the direction $HF_D$ of the handling force HF.

In step S52, the processor 54 functions as the parameter determination section 58 to determine the movement amount M as the inching-motion parameter by performing a predetermined calculation, using the direction $HF_D$ of the handling force HF, a target direction TD of the robot 12, and a target movement amount TM of the robot 12 in the target direction TD.

Hereinafter, the target direction TD and the target movement amount TM will be described with reference to FIG. 11. When causing the robot 12 to perform the inching motion in response to the handling force HF, there is a case where the operator wishes to cause the end effector 26 of the robot 12 to inch, such that a movement amount in the predetermined target direction TD becomes the predetermined target movement amount TM.

Figure 11:
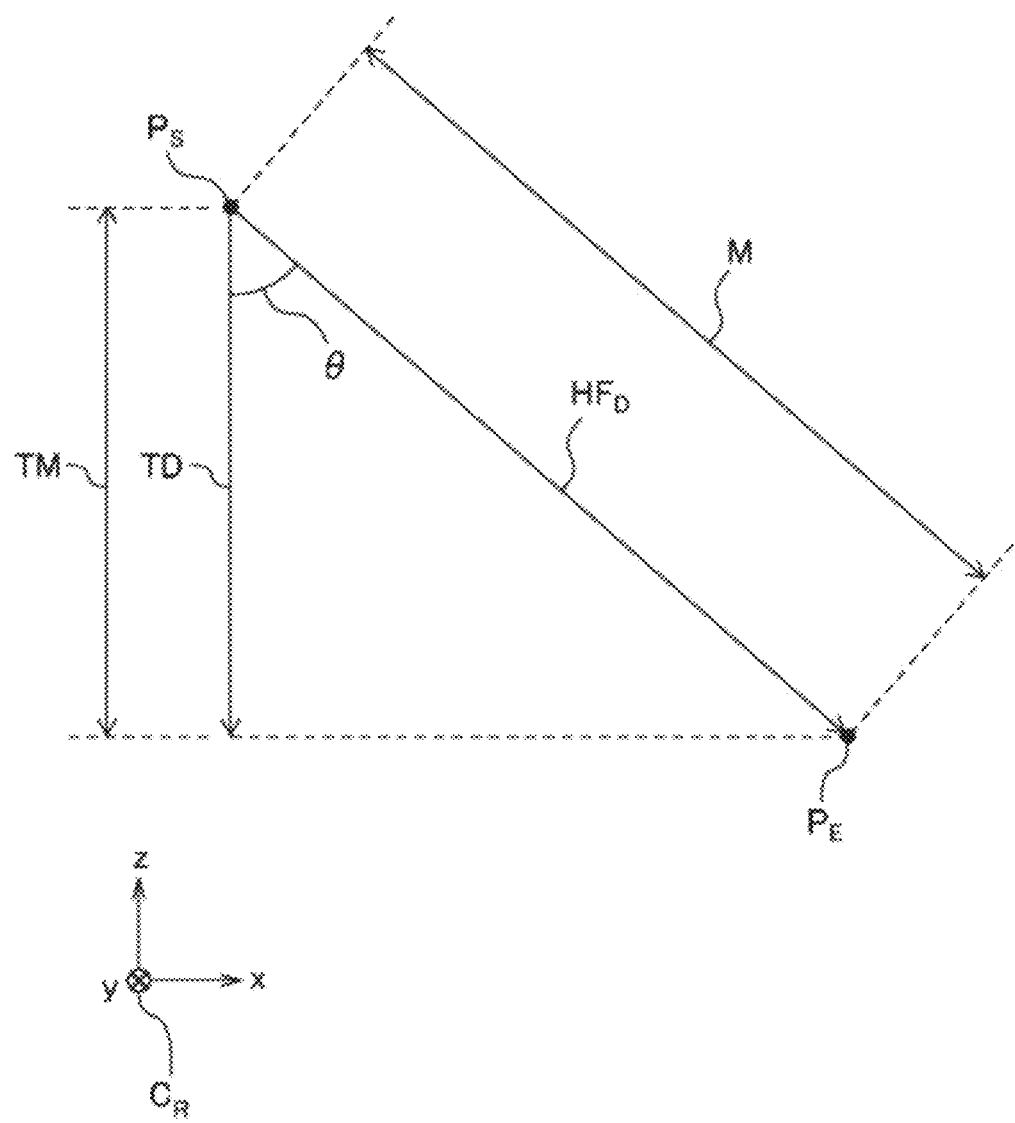
FIG. 11 is a diagram for describing a method of determining a movement amount in an inching motion by a predetermined calculation.

For example, in an example illustrated in FIG. 11, the target direction TD is defined as the z-axis negative direction of the robot coordinate system $C_R$ (or vertically downward). The target movement amount TM is defined by the operator as a value such as 1 [mm]. Information of the target direction TD and the target movement amount TM is pre-stored in the memory 40.

In the present embodiment, after acquiring the direction. $HF_D$ of the handling force HF detected by the force sensor 14, the processor 54 calculates an angle θ between the direction $HF_D$ and the target direction TD. Then, from the angle θ and the target movement amount TM, the processor 54 determines the movement amount M of the end effector 26 of the robot 12 in the direction $HF_D$ by an equation of M=TM/sin θ.

If the processor 54 causes the end effector 26 to move in the direction $HF_D$ by the movement amount M determined by the above-described calculation, the movement amount of the end effector 26 in the target. direction TD (the negative direction of the z-axis in the example illustrated in FIG. 11) coincides with the target movement amount TM. In this way, the processor 54 determines the movement amount M by performing the predetermined calculation, using the direction $HF_D$, the target direction TD, and the target movement amount TM.

Then, in step S42, the processor 54 determines whether or not the movement amount L of the robot 12 (in particular, the end effector 26) in the inching motion started in step S41 coincides with the movement amount M determined in step S52. When it is determined YES in step S42, in step S43, the processor 54 stops the inching motion of the robot 12.

As described above, in the present embodiment, the processor 54 determines the movement amount M as the inching-motion parameter by performing the predetermined. calculation, while executing the inching motion of the robot 12. According to this configuration, it is possible to inch the robot 12 such that the movement amount of the robot 12 (specifically, the end effector 26) in the target direction TD coincides with the predetermined target movement amount TM.

Note that, in the flow illustrated in FIG. 10, the processor 54 may execute step S52 next to step S51 to determine the movement amount M, and subsequently execute step S41. In this case, the processor 54 starts the inching motion in step S41 after determining the movement amount M.

Further, when executing the flow of FIG. 8, FIG. 9, or FIG. 10 described above, the processor 54 may functions as the change acquisition section 44 and execute step S2 and step S4 illustrated in FIG. 3. In this case, the processor 54 may execute step S2 after step S1, and execute step S4 after step S12 in FIG. 8, step S21 in FIG. 9, or step S51 in FIG. 10.

In the robot system 50, the processor 54 may function as the parameter determination section 58 to determine, as the inching-motion parameter, not only the movement amount M but also a movement direction $D_I$ in which the robot 12 (specifically, the end effector 26) is to be moved in the inching motion. The processor 54 can determine the movement direction $D_I$ by executing the flow of FIG. 5, FIG. 6, or FIG. 7.

For example, the above-described set mode start command includes a movement-amount set mode start command and a direction set mode start command. When receiving the movement-amount set mode start command, the processor 54 executes the flow in FIG. 5, FIG. 6, or FIG. 7 described above to determine the movement amount M. On the other hand, when receiving the direction set mode start command, the processor 54 executes the flow in FIG. 5, FIG. 6, or FIG. 7 to determine the movement direction $D_I$.

When executing the process in FIG. 5 in order to determine the movement direction $D_I$, in step S15, the processor 54 determines the movement direction $D_I$ as the inching-motion parameter in response to the detected value $HF_V$ (e.g., the maximum value $HF_{V\_MAX}$, the integral value $\int [HF_V]dt$, or the average value $HF_{V\_AVE}$) detected within the period of time $t_{th}$.

As an example, the processor 54 may determine the movement direction $D_I$ to the x-axis direction of the robot coordinate system $C_R$ if the maximum value $HF_{V\_MAX}$ of the detected value $HF_V$ satisfies $HF_{th3} < HF_{V\_MAX} \leq HF_{V\_MAX1}$, may determine the movement direction $D_I$ to the y-axis direction of the robot coordinate system $C_R$ if the maximum value $HF_{V\_MAX}$ of the detected value $HF_V$ satisfies $HF_{V\_MAX1} < HF_{V\_MAX} \leq HF_{V\_MAX2}$, and may determine the movement direction $D_I$ to the z-axis direction of the robot coordinate system. $C_R$ if the maximum value $HF_{V\_MAX}$ of the detected value $HF_V$ satisfies $HF_{V\_MAX2} HF_{V\_MAX} \leq HF_{V\_MAX3}$. As a result, the operator A can intuitively set the movement direction $D_I$ by changing the magnitude of the handling force HF applied to the handle 28.

On the other hand, when carrying out the flow in FIG. 6 in order to determine the movement direction $D_I$, in step S23, the processor 54 determines the movement direction $D_I$ in response to the elapsed time $t_P$.

Specificaliy, the processor 54 may determine the movement direction. $D_I$ to the x-axis direction of the robot coordinate system $C_R$ if the elapsed time $t_P$, which is stored in the memory 40 when the processor 54 determines YES in step S22, satisfies $t_{p1} < t_p \leq t_{p2}$, may determine the movement direction $D_I$ to the y-axis direction of the robot coordinate system $C_R$ if the elapsed time $t_P$ satisfies $t_{p2} < t_p \leq t_{p3}$, and may determine the movement direction $D_I$ to the z-axis direction of the robot. coordinate system $C_R$ if the elapsed time $t_P$ satisfies $t_{p3} < t_p \leq t_{p4}$. As a result, the operator A can intuitively set the movement direction by changing the period of time when the operator A continuously applies the handling force HF to the handle 28.

On the other hand, when carrying out the flow in FIG. 7 in order to determine the movement direction in step S36, the processor 54 determines the movement direction $D_I$ in response to the counted number of times "n". Specifically, the processor 54 may determine the movement direction $D_I$ to the x-axis direction of the robot coordinate system $C_R$ if the number of times "n" is $n_1$ (n=$n_1$), determine the movement direction $D_I$ to the y-axis direction of the robot coordinate system. $C_R$ if the number of times "n" is $n_2$ (n=$n_2$) and determine the movement direction $D_I$ to the z-axis direction of the robot coordinate system $C_R$ if the number of times "n" is $n_3$ (n=$n_3$). As a result, the operator A can intuitively set the movement direction $D_I$ by changing the number of times for which he/she taps the handle 28.

Note that the processor 54 may be configured to switch. the set mode between the movement amount set mode and the direction set mode, in response to the input information from the operator A. For example, the operator A operates the input device 17 to input information for selecting either the movement-amount set mode or the direction set mode. In response to the input information from the operator A, the input device 17 transmits the movement-amount set mode start command or the direction set mode start. command to the processor 38.

The processor 38 executes the flow in FIG. 5, FIG. 6, or FIG. 7 in response to the command from the input device 17 to determine the movement amount M or the movement direction $D_I$. In this case, the input device 17 may include the button or switch provided at the handle 28 and configured to select either the movement-amount set mode or the direction set mode.

As stated above, the processor 54 can determine both the movement amount M and the movement direction $D_I$ in advance. Thereafter, when receiving the inching-motion mode start command, the processor 54 functions as the change acquisition section 44 and the inching motion execution section 46, and executes the flow illustrated in FIG. 3. In step S5 in FIG. 3 executed at this time, the processor 54 moves the robot 12 in the predetermined movement direction $D_I$ by the predetermined movement amount M.

Note that, in a case where the operation mode of the robot system 50 is transferred to the set mode to determine the movement amount M and the movement direction $D_I$ as the inching-motion parameter, when the force sensor 14 repeatedly detects the handling force HF for a plurality of times, the processor 54 may determine the respective movement amount M and movement direction $D_I$ in response to the handling forces HF detected for different times from each other.

For example, if the processor 54 receives the set mode start command and starts the set mode, and subsequently the force sensor 14 repeatedly detects the handling force HF for a plurality of times, the processor 54 functions as the parameter determination section 58 to determine the movement amount M in response to the detected value $HF_V$ of the handling force HF detected for a predetermined time, or the period of time $t_P$ when the detected value $HF_V$, which is detected for the predetermined time, continuously exceeds the predetermined threshold value $HF_{th4}$, and determines the direction $HF_D$ of the handling force HF detected for a different. time from the predetermined. time as the movement direction $D_I$.

Specifically, assume that the operator A applies the handling force HF to the handle 28 two times in total. In this case, by executing the flow of steps S12 to S15 in FIG. 5 for the handling force HF detected by force sensor 14 for the first time, the processor 54 may determine the movement amount M in response to the firstly detected value $HF_V$. Alternatively, by executing the flow of steps S21 to S23 in FIG. 6 for the handling force HF detected by the force sensor 14 for the first time, the processor 54 may determine the movement amount N in response to the period of time $t_P$ when the firstly detected value $HF_V$ continuously exceeds the threshold value $HF_{th4}$.

On the other hand, the processor 54 determines the direction $HF_D$ of the handling force HF detected by the force sensor 14 for the second time as the movement direction $D_I$ of the robot 12 in the inching motion. In this manner, when the force sensor 14 repeatedly detects the handling force HF for a plurality of times, the processor 54 determines the movement amount M or the movement direction $D_I$ in response to the handling force HF detected for one of the plurality of times. According to this configuration, the operator A can intuitively and arbitrarily set each of the movement amount N and the movement direction $D_I$.

Note that the movement direction $D_I$ in which the robot 12 (the end effector 26) is to inch in step S5 in FIG. 3 may be predetermined as a direction along a movement path of the robot 12. For example, this movement path is predetermined by e.g. a computer program as a movement path from a first teaching point $TP_1$ to a second teach point $TP_2$. In this case, the movement path may be straight or curved, and the movement amount M may be defined as a total distance in a direction along the movement path.

Also, in the inching motion in steps S5 or S41 described above, the processor 38 or 54 may change an orientation of the end effector 26, instead of moving the end effector 26 of the robot 12 (or while moving the end effector 26 of the robot 12). For example, the processor 38 or 54 may rotate the end effector 26 by a predetermined movement amount $M_P$ (angle) in a direction $D_P$ around the x-axis, y-axis, or z-axis of the robot. coordinate system $C_R$ (or another coordinate system, such as a tool coordinate system set for the end effector 26), thereby changing the orientation of the end effector 26.

In this case, the processor 54 may function as the parameter determination section 58 and execute the flow illustrated in FIG. 5, FIG. 6, or FIG. 7 to determine, as the inching-motion parameter, the movement amount $M_P$ and the direction $D_P$ for changing the orientation of the end effector 26. For example, when carrying out the flow in FIG. 5 in order to determine the direction $D_P$ in which the orientation is changed, in step S15, the processor 54 determines the direction $D_P$ as the inching-motion parameter in response to the detected value $HF_V$ (maximum value $HF_{V\_MAX}$, integral value $\int [HF_V]dt$, or average value detected within the period of time $t_{th}$.

As an example, the processor 54 may determine the direction $D_P$ as a direction around the x-axis of the robot coordinate system $C_R$ if the maximum value $HF_{V\_MAX}$ of the detected value $HF_V$ satisfies $HF_{th3} < HF_{V\_MAX} \leq HF_{V\_MAX1}$, determine the direction $D_P$ as a direction around the y-axis of the robot coordinate system $C_R$ if the maximum value $HF_{V\_MAX}$ of the detected value $HF_V$ satisfies $HF_{V\_MAX1} < HF_{V\_MAX} \leq HF_{V\_MAX2}$, and determine the direction $D_P$ as a direction around the z-axis of the robot coordinate system $C_R$ if the maximum value $HF_{V\_MAX}$ of the detected value $HF_V$ satisfies $HF_{V\_MAX} < HT_{V\_MAX} \leq HF_{V\_MAX3}$. Similarly, the processor 54 can determine the movement amount $M_P$ as the inching-motion parameter in response to the detected value $HF_V$.

It will be understood that, by executing the flow illustrated in FIG. 6 or FIG. 7, the processor 54 can determine the movement amount $M_P$ and the direction $D_P$ in response to the elapsed time $t_P$ or the number of times "n". According to this configuration, the operator A can intuitively set the direction $D_P$ and the movement amount $M_P$ in and by which the orientation of the end effector 26 is changed in the inching motion.

In the embodiments described above, the force sensor 14 is disposed between the base 34 and the handle 28. However, the force sensor 14 may be provided at any portion of the robot 12 at proximal side of the handle 28 (i.e., at the robot base 18 side). For example, the force sensor 14 may be provided at the robot arm 22 or the robot base 18.

Also, the force sensor 14 is not limited to the six-axis force sensor, but may be comprised of a plurality of torque sensors capable of detecting torques around the drive shafts of the robot 12, or any other type of force sensor. Furthermore, the change acquisition section 44 may be omitted from the robot system 10 illustrated in FIG. 2. In this case, step S4 illustrated in FIG. 3 is omitted, and the processor 38 proceeds to step S5 when it determines YES in step S3.

Further, the robot 12 is not limited to the vertical articulated robot, but may be any other type of robot, such as a horizontal articulated robot, a parallel link robot, or the like. Although the present disclosure has been described through the above embodiments, the above embodiments are not intended to limit the claimed invention.

The invention claimed is:

1. A robot system comprising:
a robot including a handle;
a force sensor configured to detect a handling force applied to the handle; and
an inching motion execution section configured to execute an inching motion to move the robot by a determined movement amount, in response to the handling force detected by the force sensor,
wherein the inching motion execution section is configured to:
start the inching motion in response to a detected value of the force sensor exceeding a predetermined threshold value, and
stop the robot to end the inching motion in response to the robot being moved by the determined movement amount, even in response to the detected value still exceeding the threshold value.

2. The robot system of claim 1, wherein the inching motion execution section does not execute the inching motion when a detected value of the handling force detected by the force sensor is smaller than a predetermined lower limit value or is larger than a predetermined upper limit value.

3. The robot system of claim 1, further comprising a change acquisition section configured to acquire a degree of change in a detected value of the handling force detected by the force sensor, wherein
the inching motion execution section does not execute the inching motion when the degree of change is smaller than a predetermined lower limit value or is larger than a predetermined upper limit value.

4. The robot system of claim 1, wherein, in the inching motion, the inching motion execution section moves the robot in a direction of the handling force detected by the force sensor or in a direction shifted from the direction of the handling force by a predetermined angle.

5. The robot system of claim 1, further comprising a parameter determination section configured to determine an inching-motion parameter based on the handling force detected by the force sensor, the inching-motion parameter including the movement amount or a movement direction in which the robot is to be moved in the inching motion.

6. The robot system of claim 5, wherein the parameter determination section is configured to:
determine the inching-motion parameter in response to a detected value of the handling force detected by the force sensor;
determine the inching-motion parameter in response to a period of time when the detected value continuously exceeds a predetermined threshold value; or
determine the inching-motion parameter in response to the number of times for which the force sensor detects the handling force within a predetermined period of time.

7. The robot system of claim 5, wherein, when the force sensor repeatedly detects the handling force for a plurality of times, the parameter determination section is configured to:
determine the movement amount as the inching-motion parameter, in response to a detected value of the handling force detected for one of the plurality of times, or a period of time when the detected value detected for the one of the plurality of times continuously exceeds a predetermined threshold value; and
determine, as the movement direction of the inching-motion parameter, a direction of the handling force detected for another one of the plurality of times.

8. The robot system of claim 5, wherein the parameter determination section is configured to determine the movement amount as the inching-motion parameter by performing a predetermined calculation, using a direction of the handling force, a target direction of the robot, and a target movement amount of the robot in the target direction.

9. A method of controlling a robot including a handle, the method comprising:
- detecting, by a force sensor, a handling force applied to the handle; and
- executing an inching motion to move the robot by a determined movement amount, in response to the handling force detected by the force sensor,
- wherein the inching motion execution section is configured to:
  - start the inching motion in response to a detected value of the force sensor exceeding a predetermined threshold value, and
  - stop the robot to end the inching motion in response to the robot being moved by the determined movement amount, even in response to the detected value still exceeding the threshold value.

10. A robot system comprising:
- a robot including a handle;
- a force sensor configured to detect a handling force applied to the handle;
- an inching motion execution section configured to execute an inching motion to move the robot by a determined movement amount, in response to the handling force detected by the force sensor; and
- a parameter determination section configured to determine an inching-motion parameter of the inching motion based on the handling force detected by the force sensor,
- wherein the parameter determination section is configured to determine the inching-motion parameter in response to a number of times for which the force sensor detects the handling force within a predetermined period of time.

* * * * *